(12) United States Patent
Guo et al.

(10) Patent No.: US 11,568,259 B2
(45) Date of Patent: Jan. 31, 2023

(54) CROSS BATCH NORMALIZATION

(71) Applicant: Zoox, Inc., Foster City, CA (US)

(72) Inventors: Shimin Guo, San Mateo, CA (US); Ethan Miller Pronovost, San Mateo, CA (US); Connor Jonathan Soohoo, Redwood City, CA (US); Qijun Tan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 639 days.

(21) Appl. No.: 16/653,656

(22) Filed: Oct. 15, 2019

(65) Prior Publication Data

US 2021/0110272 A1 Apr. 15, 2021

(51) Int. Cl.
| | | |
|---|---|---|
| *G06N 5/02* | (2006.01) | |
| *G06N 3/02* | (2006.01) | |
| *G06N 3/08* | (2006.01) | |
| *G06N 3/04* | (2006.01) | |
| *G06N 20/00* | (2019.01) | |
| *G06N 20/10* | (2019.01) | |

(52) U.S. Cl.
CPC ........... *G06N 3/084* (2013.01); *G06N 3/0454* (2013.01)

(58) Field of Classification Search
USPC ........... 706/6, 12, 15, 16, 18, 25, 33, 45, 46
See application file for complete search history.

(56) References Cited

U.S. PATENT DOCUMENTS

| | | | |
|---|---|---|---|
| 2016/0217368 A1* | 7/2016 | Ioffe ................... | G06N 3/0454 |
| 2020/0125949 A1* | 4/2020 | Hechtman ................ | G06N 3/08 |

OTHER PUBLICATIONS

Ioffe et al, "Batch Normalization: Accelerating Deep Network training by Reducing Internal Covariate Shift", Proceedings of Machine Learning Research, vol. 37, Jul. 7, 2015, pp. 448-456.
PCT International Search Report and the Written Opinion for Application No. PCT/US2020/055805, dated Feb. 24, 2021, 15 pgs.
Qin et al, "Training Deep NEts with Progressive Batch Normalization on Multi-GPUs", International Journal of Parallel Programming, vol. 47, No. 3, Dec. 17, 2018, pp. 373-387.
Ying et al, "Image Classification at Supercomputer Scale", arxiv.org, Nov. 16, 2018, pp. 1-14.
Peng, et al., "MegDet: A Large Mini-Batch Object Detector," CVPR paper, Open access version, provided by the Computer Vision Foundation, pp. 6181-6189.
International Preliminary Report on Patentability for PCT Application No. PCT/US20/55805, dated Apr. 28, 2022.

\* cited by examiner

*Primary Examiner* — Daquan Zhao
(74) *Attorney, Agent, or Firm* — Lee & Hayes, P.C.

(57) ABSTRACT

Techniques for training a machine learning model are described herein. For example, the techniques may include implementing a cross batch normalization layer that generates a cross batch normalization layer output based on a first layer output during training of the neural network. The training may be based on a local batch of training examples of a global batch including the local batch and at least one remote batch of training examples. The cross batch normalization layer output may include normalized components of the first layer output determined based on global normalization statistics for the global batch. Such techniques may be used to train a neural network over distributed machines by synchronizing batches between such machines.

20 Claims, 6 Drawing Sheets

CROSS BATCH NORMALIZATION

BACKGROUND

Machine learning algorithms such as neural networks often learn to perform a task by considering training data. For example, image data that has been previously associated with a classification may be fed into an artificial neural network to train the neural network to recognize the classification. Such neural networks often employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
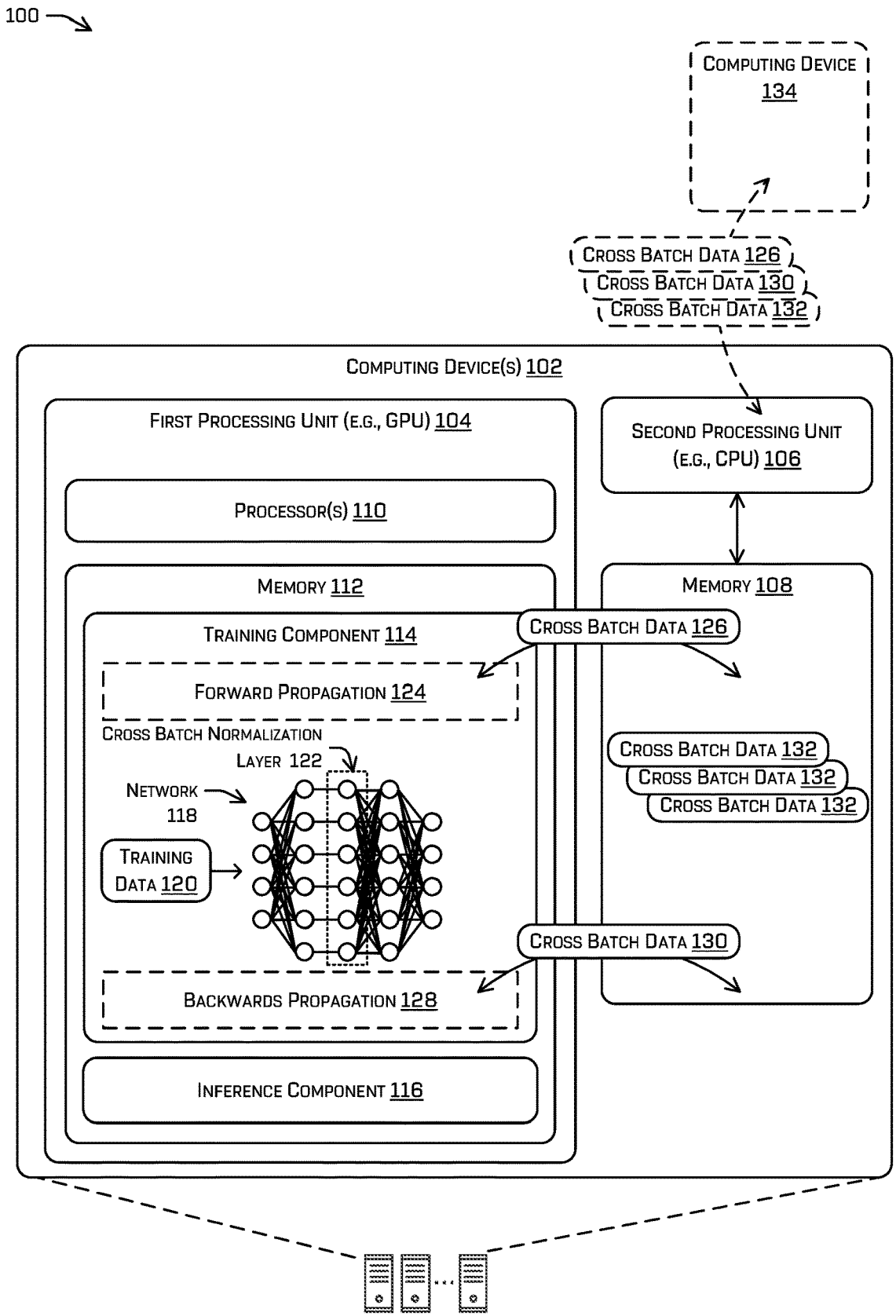
FIG. 1 illustrates an example environment in which the techniques discussed herein may be implemented.

This disclosure is directed to techniques for training a machine learning algorithm. For example, the techniques may be used to train a neural network in parallel across multiple computing devices. More particularly, the systems and techniques disclosed herein may provide for synchronization of normalization statistics between local batches of inputs in a cross batch normalization layer for a global batch of inputs including a plurality of local batches.

Each layer of a neural network may generate an output from a received input (e.g. either an initial input to the neural network or an input from a preceding layer). Some or all of the neural network layers may generate outputs from inputs in accordance with current values of a set of parameters for the neural network layer. For example, some layers may multiply the received input by a matrix of current parameter values as part of generating an output from the received input.

The output is then output or passed to the next layer in the neural network. In this way, the neural network layers collectively process neural network inputs received by the neural network system to generate a respective neural network output for each received neural network input.

In many examples, an artificial neural network may be trained to perform one or more tasks. Some examples of machine learning models that may be trained include neural networks that may: classify objects in image data; identify an emergency vehicle in audio data; generate bounding boxes from lidar data; predict locations of objects; determine when to buy plane tickets; identify cancer in tissue samples, and so on.

Such training includes forward propagation and backwards propagation. In forward propagation for an artificial neural network, data may be input into the artificial neural network to compute activations at layers within the artificial neural network, and ultimately, an output. Then, during back propagation (also referred to as a backwards pass or backwards propagation), an error representing a difference between the output and a desired output (e.g., a ground truth) may be propagated backwards through the layers of the artificial neural network to adjust the current values of the sets of parameters for the neural network layers (e.g., using gradient descent). The backwards propagation may include executing one or more gradient operations associated with the one or more operations of the forward propagation to generate one or more gradients.

As mentioned above, the systems and techniques disclosed herein relate to neural networks that may include one or more cross batch normalization layers. Herein, a collection of local batches of training samples processed by a neural network may be referred to as a batch or a global batch of training samples. Batch normalization layers according to the current disclosure may operate to normalize local batches of inputs (also referred to herein as current batches or mini-batches) using global normalization statistics generated from the global batch of inputs at that cross batch normalization layer. More particularly, this specification describes synchronization of global normalization statistics between local batches of inputs, and, in some examples, between local batches being input in parallel to a distributed training pipeline. For example, such a distributed training pipeline may include a plurality of Graphics Processing Units (GPUs) that collectively operate to train a neural network using a training data set. In some examples, each of the GPUs may receive a local batch of training samples selected from the entire training data set. Each GPU may then input the respective local batch of training samples to a local copy of the neural network as training data.

The local batches of inputs may vary due to differences in the training examples contained in each local batch. For example, the training data may comprise a set of data, e.g., images with ground truth labels. Due to limitations in working memory (e.g., GPU memory size), a batch may comprise randomly sampled elements from the set of training data. For example, each local batch may include ten or twenty images randomly selected from the entire training set. As such, in one example, the images of a first local batch may include more cars than images of a second local batch. Because of the variations in batches, without normalization between the local batches, the training may result in difference in parameters that may be back propagated. Normalizing helps minimize variations between batches and reduce chances where activations cause large unmanageable numbers and/or ensure consistency in learning.

Specifically, the cross batch normalization layers may perform two general functions during training. First, during forward propagation, the cross batch normalization layers may normalize the local batch inputs to the global batch of training samples. The normalized local batch of inputs may then be input to the layer following the cross batch normalization layer. Second, during back propagation, the neural network outputs can be used to adjust the values of the parameters of the neural network layers in the sequence, for example, through gradient descent and back propagation neural network training techniques. More particularly, normalization statistics from the forward propagation may be back propagated through as part of adjusting the values of the parameters of the neural network, such as part of performing the back propagation training technique.

In some examples, to normalize the inputs for the local batch, a cross batch normalization layer may (1) compute the local batch mean of the local batch; (2) compute the local batch variance of the local batch; (3) distribute the local statistics (e.g., mean and variance) or local intermediate values based on the local statistics; (4) receive remote statistics or remote intermediate values from other processors executing the cross batch normalization layer; (5) compute a global batch mean and a global batch variance based on local and remote statistics or intermediate values; (6) normalize the local input using the global batch mean and global batch variance; and (7) scale and shift the normalized local input by global scale and shift parameters.

In some examples, the global variance may be determined based on an aggregation of the difference between a sum of the local batch variance and the square of the local batch mean and the square of the global batch mean. In examples in which local batches vary in size, the sum may be weighted.

The following example provides for the determination of the global batch variance where the shared values or cross batch data includes local batch means and local batch variances. To determine the local batch mean of the current local batch (i), the local batch mean $\mu_i$ may be computed as:

$$\mu_i = \frac{1}{n_i} \sum_{j=1}^{n_i} x_j^{(i)}$$

where $n_i$ is the count of the $i^{th}$ local batch and $x_j^{(i)}$ is the jth input from the preceding layer for the $i^{th}$ local batch.

Similarly, the local batch variance a may be computed as:

$$\sigma_i^2 = \frac{1}{n_i} \sum_{j=1}^{n_i} (x_j^{(i)} - \mu_i)^2$$

The cross batch normalization layers may determine and share cross batch data for use in determining the global batch mean and global batch variance.

In the case that the local batch mean and local batch variance are distributed, the global batch mean $\mu$ may be computed as:

$$\mu = \sum_i p_i \mu_i$$

where $p_i$ is the relative size of the current local batch (i) (e.g. the ratio of the count of the current local batch (i) to the total count for the global batch).

The global batch variance may then be determined. For example, the global batch variance (e.g. $\sigma^2$) may be determined as:

$$\sigma^2 = \sum_i p_i (\sigma_i^2 + \mu_i^2) - \mu^2$$

Additional details and variations of the forward propagation and back propagation phases of operation of the cross batch normalization layer are provided below with reference to the following figures.

In examples, the cross batch normalization techniques discussed herein may provide higher accuracy without sacrificing training speed when compared to other training techniques not using batch normalization schemes. In addition, in some examples, the cross batch normalization techniques discussed herein may reducing training time by training in parallel, improve accuracy by exchanging normalization data, reduce data to be exchanged during normalization by simplifying the data that is exchanged, and/or provide the ability to training on different size batches (and different types of GPUs) by incorporating the size of the batch as a parameter. Further, such techniques provide for training networks based on larger datasets than would otherwise not be enabled due to, for example, limitations of memory, processing power, etc. (thereby creating more robust learned networks in shorter amounts of time).

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an example environment 100 in which the techniques discussed herein may be implemented. In particular, the environment 100 includes a computing device(s) 102 that includes a first processing unit 104, a second processing unit 106, and memory 108 associated with the second processing unit 106. The first processing unit 104 (e.g., a processor(s) 110 associated with the first processing unit 104) and the second processing unit 106 may each comprise one or more GPUs, one or more CPUs, one or more tensor processing units, one or more neural processing units, one or more digital signal processors, etc. In many examples, the first processing unit 104 is implemented as a GPU and the second processing unit 106 is implemented as a CPU, although other configurations may be used. As illustrated, the first processing unit 104 may include the processor(s) 110 and memory 112. The memory 112 may store a training component 114 and an inference component 116 that are executable by the processor(s) 110. Further, though the first processing unit 104 and second processing unit 106 are depicted in FIG. 1 as residing in the same computing device 102, such a depiction is for illustrative purposes, as the processing units may be in separate units, which may or may not be local.

In general, computing device 102 may be part of a distributed training pipeline of multiple computing devices training the neural network in parallel based on local batches of training examples of a global batch. During the parallel training, cross batch data may be shared among the computing devices and used for batch normalization. However, in other examples, the computing device 102 may operate alone to train the neural network by processing the local batches in sequence while performing batch normalization between the local batches. The discussion below focuses on the parallel use case with additional discussion as needed for the sequential use case.

The training component 114 may be executed by the processor(s) 110 to train a neural network 118 (also referred to as "artificial neural network 118") based on training data 120. The training data 120 may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data 120 may be used for image classification and, as such, may include an image of an environment that is captured by an autonomous vehicle and that is associated with one or more classifications. In some examples, such a classification may be based on user input (e.g., user input indicating that the image depicts a specific type of object). In some examples, such labeled classifications (or more generally, the labeled output associated with training data) may be referred to as ground truth.

During training, the training component 114 may transfer local cross batch data 126 and 130 that is computed by the training component 114 (and stored, at least temporarily, in the memory 112) onto the memory 108 associated with the second processing unit 106. The local cross batch data 126 and 130 may be distributed to other computing device(s) 102 (one of which is shown as computing device 134, also referred to as remote computing devices) by the second processing unit 106 and remote cross batch data 132 may be received from those other computing device(s) 102 and stored in the memory 108. In addition, the training component 114 may retrieve the remote cross batch data 132 from the memory 108 for storage in the memory 112 associated with the first processing unit 104 when the cross batch data 126, 130 and 132 is needed during training. Because the cross batch data may be a small number of scalar values instead of the entire local batch of values, the amount of data to be transferred between computing devices 102 may be greatly reduced.

The inference component 116 may be executed by the processor(s) 110 to process new data with the neural network 118 and make an inference regarding the new data (e.g., predict a value, classify the new data, etc.). To illustrate, the inference component 116 may implement the neural network 118 to classify objects in a new image captured by an autonomous vehicle. While implementing the neural network 118, the inference component 116 may not perform backwards propagation, since backwards propagation is used to train the neural network 118. In some examples, the inference component 116 may be a part of a separate computing device, such as the aforementioned autonomous vehicle.

Data that is used by the training component 114 (e.g., the training data 120) and/or the inference component 116 (e.g., data that is fed into the neural network 118 for inference) may include a variety of data. For example, the data may include depth data from one or more sensors, such as Light Detection and Ranging (lidar) data, radar data, image data (as determined from multi-view geometry), depth sensor data (time of flight, structured light, etc.), etc. In some examples, the computing device(s) 102 may receive (e.g., retrieve) data from a data store, such as a database. Here, the data store can store data over time as the data is received from one or more vehicles or other devices within an environment. In some examples, the computing device(s) 102 may receive data from one or more vehicles or other devices as the data is being captured (e.g., real-time), in a batched manner, in one or more log files received from a vehicle, or at any other time.

In some examples, the computing device(s) 102 may receive a plurality of lidar datasets from a plurality of lidar sensors operated in connection with a perception system of an autonomous vehicle. In some examples, the computing device(s) 102 may combine or fuse data from two or more lidar sensors into a single lidar dataset (also referred to as a "meta spin"). In some examples, the computing device(s) 102 may extract a portion of lidar data for processing, such as over a period of time. In some examples, the computing device(s) 102 may receive radar data and associate the radar data with the lidar data to generate a more detailed representation of an environment. In one illustration, data includes lidar data (e.g., point clouds) associated with various objects in an urban environment, such as cars, trucks, roads, buildings, bikes, pedestrians, etc. Of course, such data need not be sensor data at all. In various examples, training data may comprise features defined for a particular problem and their associated expected output. As a non-limiting example, such data may comprise house square foot size, a number of bedrooms, a number of floors, etc., with an associated home sale price for training a network to predict a houses likely sale price.

As illustrated, the neural network 118 may include a plurality of layers. Each layer may include one or more nodes (also referred to as neurons or perceptrons). In the example of FIG. 1, the neural network 118 includes five layers and a cross batch normalization layer 122 includes six nodes. However, it can be understood that any number of layers and/or nodes may be implemented. In examples, the neural network 118 may include a bias node(s), not illustrated in FIG. 1. A node, such as a node associated with a hidden layer, may be associated with an operation and a weight. An operation at one layer may be executed to generate an activation, which is provided to a next layer as input (e.g., to an operation associated with the next layer in a forward graph). Such activations may be, for example, a sigmoid function, arctan, ReLU, hyperbolic arctan, Heaviside, and the like.

In examples, the neural network 118 may include one or more cross batch normalization layer(s) 122. Although other layers in the neural network 118 may be cross batch normalization layers 122, for ease of illustration, a single cross batch normalization layer 122 is shown in FIG. 1. As discussed above, during forward propagation 124, the cross batch normalization layers 122 may normalize the local batch inputs (e.g. inputs to the cross batch normalization layer 122 based on training data 120 being input to the local neural network of computing device 102) to the global batch of training samples (e.g. the collection of local batches of training samples processed by the neural networks of a distributed training pipeline including a plurality of computing devices 102). The normalized local batch of inputs may then be input to the layer following the cross batch normalization layer 122. During back propagation 128, the neural network outputs can be used to adjust the values of the parameters of the neural network layers in the sequence, e.g., through gradient descent and backpropagation neural network training techniques. Further, the normalization statistics from the forward propagation may be back propagated through as part of adjusting the values of the parameters of the neural network, i.e., as part of performing the back propagation training technique.

Additional details regarding the operation of the cross batch normalization layer are provided below with regard to FIGS. 3-5.

Although the training component 114 and the inference component 116 are illustrated in FIG. 1 as being stored on the memory 112 and implemented by the first processing unit 104, the training component 114 and/or the inference component 116 may be stored on the memory 108 and/or implemented by the second processing unit 106.

The computing device(s) 102 may be implemented as one or more laptop computers, desktop computers, servers, and so on. In examples, the computing device(s) 102 is configured in a cluster, data center, cloud computing environment, or a combination thereof. In one example, the computing device(s) 102 provides cloud computing resources, including computational resources, network resources, storage resources, and the like, that operate remotely to another computing device, such as a client device. To illustrate, the computing device(s) 102 may implement a cloud computing platform/infrastructure for building, deploying, and/or managing applications and/or services.

The memory 112 and/or the memory 108 are examples of non-transitory computer-readable media. The memory 112 and/or the memory 108 may store an operating system and/or one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some examples, the memory 112 may have different characteristics than the memory 108. For example, the memory 112 and the memory 108 may have different memory capacities, different abilities to read and/or write (e.g., one having the ability to read and write at the same time, while the other having the ability to read and write at different times), different read/write speeds, different sized memory buses (e.g., 64-bit, 128-bit, etc.), and so on. Further, the first processing unit 104 may have different characteristics than the second processing unit 106, such as different operating speeds, different number of cores, etc.

Although the second processing unit 106 and the memory 108 are illustrated as being part of the computing device(s) 102, in some examples the second processing unit 106 and/or the memory 108 may be located elsewhere. For example, the second processing unit 106 and/or the memory 108 may be implemented on a computing device that is remote to the computing device(s) 102.

The techniques discussed herein may be implemented in various contexts. In some examples, the techniques are implemented in the context of a machine learning application, such as TensorFlow, PyTorch, Caffe, Caffe2, etc.

Figure 2:
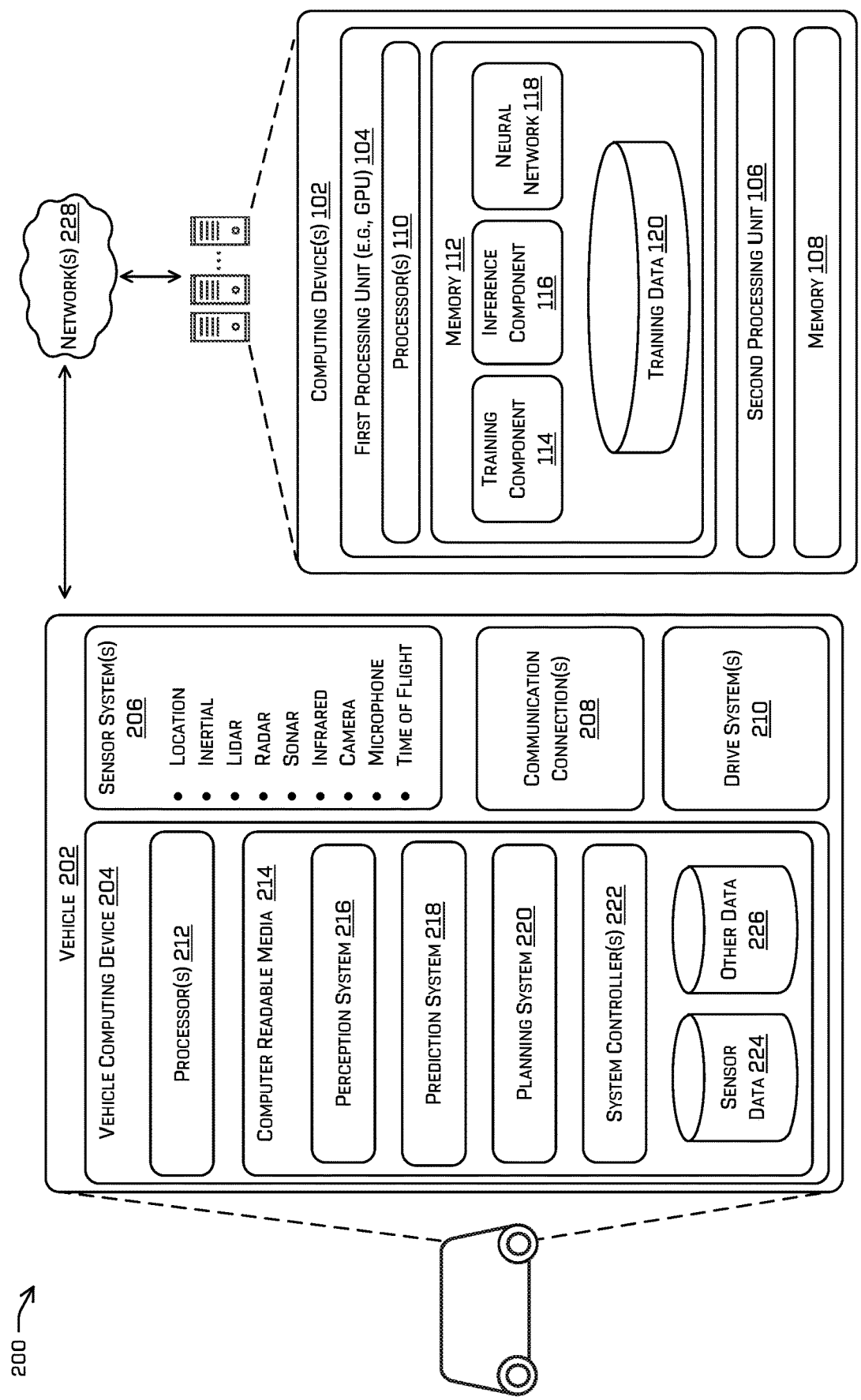
FIG. 2 depicts a block diagram of an example system for implementing the techniques described herein.

FIG. 2 is a block diagram of an example system 200 for implementing the techniques described herein, in accordance with embodiments of the disclosure. In some examples, the system 200 may include one or multiple features, components, and/or functionality of embodiments described herein with reference to FIG. 1. In some embodiments, the system 200 can include a vehicle 202 and the computing device(s) 102 of FIG. 1. The vehicle 202 may include a vehicle computing device 204, one or more sensor systems 206, one or more communication connections 208, and one or more drive systems 210.

The vehicle computing device 204 may include one or more processors 212 and computer readable media 214 communicatively coupled with the one or more processors 212. In the illustrated example, the vehicle 202 is an autonomous vehicle; however, the vehicle 202 could be any other type of vehicle, or any other system (e.g., a robotic system, a camera enabled smartphone, etc.). In the illustrated example, the computer readable media 214 of the vehicle computing device 204 stores a perception system 216, a prediction system 218, a planning system 220, one or more system controllers 222 as well as sensor data 224 and other data 226. Though depicted in FIG. 2 as residing in computer readable media 214 for illustrative purposes, it is contemplated that the perception system 216, the prediction system 218, the planning system 220, the one or more system controllers 222 as well as the sensor data 224 and the other data 226, may additionally, or alternatively, be accessible to the vehicle 202 (e.g., stored on, or otherwise accessible by, computer readable media remote from the vehicle 202).

In at least one example, the perception system 216 may be configured to receive sensor data 224 (e.g., radar data) captured during one or more-time interval intervals associated with the sensor system 206. The perception system 216 can include functionality to perform object detection, segmentation, and/or classification. In some examples, the perception system 216 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception system 216 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. The processed sensor data may be output to the prediction system 218 and/or the planning system 220.

The planning system 220 may determine a path for the vehicle to follow to traverse through the physical environment. For example, the planning system 220 may determine various routes and trajectories and various levels of detail. For example, the planning system 220 may determine a route to travel from a current location to a target location. For the purpose of this discussion, a route may include a sequence of waypoints for travelling between two locations.

In at least one example, the vehicle computing device 204 can include one or more system controllers 222, which can be configured to control steering, propulsion, braking, safety, emitters, communication, and other systems of the vehicle 202. These system controller(s) 222 may communicate with and/or control corresponding systems of the drive system(s) 210 and/or other components of the vehicle 202.

In some instances, aspects of some or all of the components discussed herein can include any models, algorithms, and/or machine learning algorithms. For example, in some instances, components in the computer readable media 214 such as the perception system 216, the prediction system 218, and/or planning system 220, and may be implemented as one or more neural networks. For instance, the perception system 216 may comprise a machine learned model (e.g., neural network) which has been trained to predict speed, trajectory, and/or other characteristics of a pedestrian (or other object) based on image data.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 206 can include multiple instances of each of these or other types of sensors. For instance, the lidar sensors may include individual lidar sensors located at the corners, front, back, sides, and/or top of the vehicle 202. As another example, the camera sensors can include multiple cameras disposed at various locations about the exterior and/or interior of the vehicle 202. The sensor system(s) 206 may provide input to the vehicle computing device 204. Additionally, or alternatively, the sensor system(s) 206 can send sensor data, via the one or more networks 228, to the one or more computing device(s) at a particular frequency, after a lapse of a predetermined period of time, in near real-time, etc.

The vehicle 202 can also include one or more communication connection(s) 208 that enable communication between the vehicle 202 and one or more other local or remote computing device(s). For instance, the communication connection(s) 208 may facilitate communication with other local computing device(s) on the vehicle 202 and/or the drive system(s) 210. Also, the communication connection(s) 208 may allow the vehicle 202 to communicate with other nearby computing device(s) (e.g., other nearby vehicles, traffic signals, etc.). The communications connection(s) 208 also enable the vehicle 202 to communicate with remote teleoperations computing device or other remote services.

The communications connection(s) 208 may include physical and/or logical interfaces for connecting the vehicle computing device 204 to another computing device (e.g., computing device(s) 102) and/or a network, such as network(s) 228. For example, the communications connection(s) 208 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 210. In some examples, the vehicle 202 may have a single drive system 210. In at least one example, if the vehicle 202 has multiple drive systems 210, individual drive systems 210 can be positioned on opposite ends of the vehicle 202 (e.g., the front and the rear, etc.). In at least one example, the drive system(s) 210 can include one or more sensor systems 206 to detect conditions of the drive system(s) 210 and/or the surroundings of the vehicle 202, as discussed above. By way of example and not limitation, the sensor system(s) 206 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 210. In some cases, the sensor system(s) 206 on the drive system(s) 210 can overlap or supplement corresponding systems of the vehicle 202.

In at least one example, the components discussed herein can process sensor data 224, as described above, and may send their respective outputs, over the one or more network(s) 228, to one or more computing device(s) 102. In at least one example, the components discussed herein may send their respective outputs to the one or more computing device(s) 102 at a particular frequency, after a lapse of a predetermined period of time, in near real-time, etc.

In some examples, the vehicle 202 can send sensor data to one or more computing device(s) 102 via the network(s) 228. In some examples, the vehicle 202 can send raw sensor data 224 to the computing device(s) 102. In other examples, the vehicle 202 can send processed sensor data 224 and/or representations of sensor data (for instance, the object perception tracks) to the computing device(s) 102. In some examples, the vehicle 202 can send sensor data 224 to the computing device(s) 102 at a particular frequency, after a lapse of a predetermined period of time, in near real-time, etc. In some cases, the vehicle 202 can send sensor data (raw or processed) to the computing device(s) 102 as one or more log files.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 212 of the vehicle 202 may be any suitable processor capable of executing instructions to process data and perform operations as described herein. By way of example and not limitation, the processor(s) 212 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 214 are examples of non-transitory computer-readable media. The computer readable media 214 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 2 is illustrated as a distributed system, in alternative examples, components of the vehicle 202 can be associated with the computing device(s) 102 and/or components of the computing device(s) 102 can be associated with the vehicle 202. That is, the vehicle 202 can perform one or more of the functions associated with the computing device(s) 102, and vice versa. Further, aspects of training component 114 can be performed on any of the devices discussed herein.

It should be noted that while FIG. 2 is illustrated as a distributed system, in alternative examples, components of the vehicle 202 can be associated with the computing device(s) 102 and/or components of the computing device(s) 102 can be associated with the vehicle 202. That is, the vehicle 202 can perform one or more of the functions associated with the computing device(s) 102, and vice versa.

The computing device(s) 102 may include one or more computing devices that are implemented at the same location and/or distributed. In one example, the first processing unit 104 is implemented on a first computing device and the second processing unit 106 and memory 108 are implemented on a second computing device. In another example, the first processing unit 104, the second processing unit 106, and the memory 108 are implemented on the same computing device. In yet other examples, other configurations are used.

Figure 3:
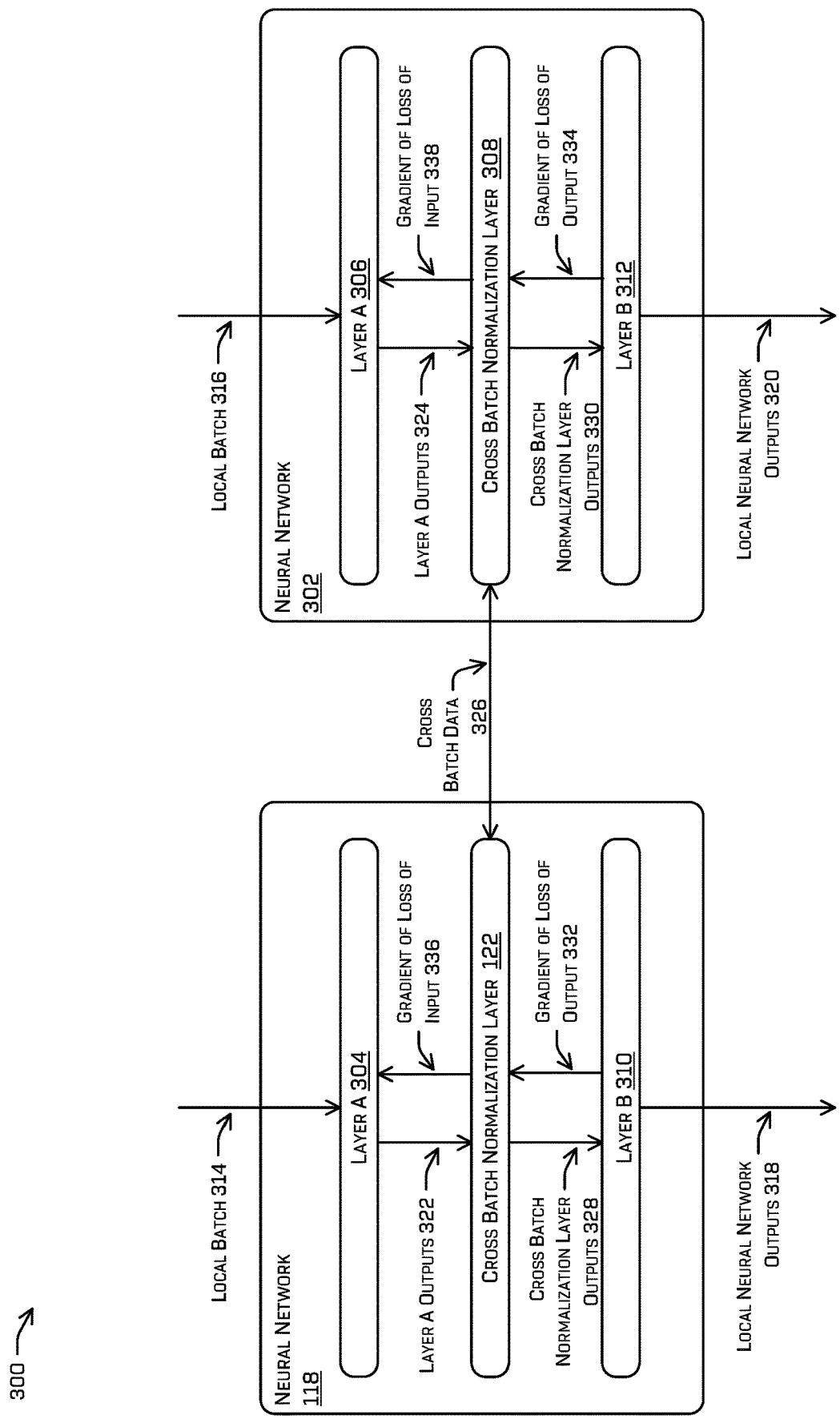
FIG. 3 illustrates an example neural network system that utilizes cross batch normalization during training of a neural network.

FIG. 3 illustrates an example system 300 that utilizes cross batch normalization during training and operation of a neural network. The example 300 represents one of many implementations for cross batch normalization according to this disclosure. In other words, fewer or more operations (e.g., blocks) and/or a different arrangement of operations may be implemented.

The neural network system 300 includes a plurality of neural networks 118 and 302, each of which may include multiple neural network layers 122 and 304-312 that are arranged in a sequence from a highest layer in the sequence to a lowest layer in the sequence. The neural network system 300 may generate neural network outputs from neural network inputs by processing the neural network inputs through each of the layers in the sequence.

The neural network system 300 can be configured to receive any kind of digital data input and to generate any kind of score or classification output based on the input.

In particular, each of the layers of the neural network is configured to receive an input and generate an output whereby the neural network layers collectively process neural network inputs received by the neural network system 300 to generate a respective neural network output for each received neural network input. Some or all of the neural network layers in the sequence generate outputs from inputs in accordance with current values of a set of parameters for the neural network layer. For example, some layers may multiply the received input by a matrix of current parameter values as part of generating an output from the received input.

The neural network system 300 also includes a cross batch normalization layer 122 and 308 between a neural network layer A 304 and 306 and a neural network layer B 310 and 310 in the sequence of neural network layers. The cross batch normalization layer 122 and 308 is configured to perform one set of operations on inputs received from the neural network layer A 304 and 306 during training of the neural network system 300 and another set of operations on inputs received from the neural network layer A 304 and 306 after the neural network system 300 has been trained.

In particular, the neural network system 300 can be trained on multiple global batches of training examples in order to determine trained values of the parameters of the neural network layers (e.g. global batches including local batches for each of neural networks 118 and 302). For example, during training, the neural network system 300 can process a global batch of training examples including local batches 314 and 316 and generate respective local neural network outputs 318 and 320 for each local batch in the global batch. The neural network outputs 318 and 320 can then be used to adjust the values of the parameters of the neural network layers 122 and 304-312 in the sequence, e.g., through gradient descent and backpropagation neural network training techniques.

During training of the neural network system 300 on a given global batch of training examples, the cross batch normalization layer 122 and 308 is configured to receive layer A outputs 322 and 324 generated by the neural network layer A 304 and 306 for the local batch 314 and 316, process the layer A outputs 322 and 324 to generate a respective cross batch normalization layer output 328 and 330 for the local batch, and then provide the cross batch normalization layer outputs 328 and 330 as an input to the neural network layer B 310 and 312. The layer A outputs 322 and 324 include a respective output generated by the neural network layer A 304 and 306 for each training example in the local batch.

Similarly, the cross batch normalization layer outputs 328 and 330 include a respective output generated by the cross batch normalization layer 122 and 308 for each training example in the local batch 314 and 316.

Generally, during forward propagation, the cross batch normalization layers 122 and 308 may compute a set of normalization statistics for the local batch from the layer A outputs 322 and 324, synchronize normalization statistics across the global batch by distributing and receiving cross batch data 326 with cross batch normalization layers of other neural networks, compute global normalization statistics, normalize the layer A outputs 322 and 324 to generate a respective normalized output 328 and 330 for the local batch, and, optionally, transform each of the normalized outputs before providing the outputs as input to the neural network layer B 310 and 312.

More particularly, in some examples, to normalize the inputs in the local batch during training, a cross batch normalization layer may (1) compute the local batch mean of the local batch; (2) compute the local batch variance of the local batch; (3) distribute the local statistics (e.g. mean and variance) or local intermediate values based on the local statistics; (4) receive remote statistics or remote intermediate values from other processors executing the cross batch normalization layer; (5) compute a global batch mean and a global batch variance based on local and remote statistics or intermediate values; (6) normalize the local input using the global batch mean and global batch variance; and (7) scale and shift normalized local output by global scale and shift parameters.

To determine the local batch mean of the current local batch (i), the cross batch normalization layer may compute the local batch mean $\mu_i$ as:

$$\mu_i = \frac{1}{n_i}\sum_{j=1}^{n_i} x_j^{(i)}$$

where $n_i$ is the count of the $i^{th}$ local batch and $x_j^{(i)}$ is the jth input from the preceding layer for the $i^{th}$ local batch (e.g. the local batch being processed by the current neural network 118 or 302).

Similarly, the local batch variance a may be computed as:

$$\sigma_i^2 = \frac{1}{n_i}\sum_{j=1}^{n_i}(x_j^{(i)} - \mu_i)^2$$

The cross batch normalization layers may determine and share cross batch data 326 for use in determining the global batch mean and global batch variance. Depending on the implementation, the cross batch normalization layers may share the local batch mean and local batch variance as cross batch data 326 or determine and share intermediate values as cross batch data 326. For example, the cross batch normalization layers may compute and distribute the intermediate values of:

$$\pi_i = p_i \mu_i$$

$$\tau_i = p_i(\sigma_i^2 + \mu_i^2)$$

where $p_i$ is the relative size of the current local batch (i) (e.g. the ratio of the count of the current local batch (i) to the total count for the global batch).

Regardless of whether the local batch mean and local batch variance or the intermediate values are distributed as the normalization statistics (e.g. cross batch data), the cross batch normalization layers may receive the distributed normalization statistics for use in determining global normalization statistics.

In the case that the local batch mean and local batch variance are distributed, the global batch mean μ may be computed as:

$$\mu = \sum_i p_i \mu_i$$

The global batch variance may then be determined. Specifically, in implementations according to this disclosure, the global batch variance may be determined based on an aggregation of the difference between a sum of the local batch variance and the square of the local batch mean and the square of the global batch mean. In examples in which local batches vary in size, the sum may be weighted based on the relative sizes of batches. For example, the global batch variance (e.g. $\sigma^2$) may be determined as:

$$\sigma^2 = \sum_i p_i(\sigma_i^2 + \mu_i^2) - \mu^2$$

In the case that intermediate values are determined and shared, the cross batch normalization layers may aggregate the intermediate values into global intermediate values as:

$$\pi = \sum_i \pi_i$$

$$\tau = \sum_i \tau_i$$

From these global intermediate values, the global batch mean and global batch variance may be computed as:

$$\mu = \pi$$

$$\sigma^2 = \tau - \pi^2$$

The normalization statistics computed by the cross batch normalization layer 122 and 308 and the manner in which the cross batch normalization layer 122 and 308 normalizes the layer A outputs 322 and 324 during training depend on the nature of the neural network layer A 304 and 306 that generates the layer A outputs 322 and 324.

Using the global batch normalization statistics (e.g. the global batch variance (e.g. $\sigma^2$) and the global batch mean $\mu$), the input received by the cross batch normalization layer from the preceding layer (e.g. $x_j^{(i)}$) may be normalized into a normalized output (e.g. $\hat{x}_j^{(i)}$) and computed as:

$$\hat{x}_j^{(i)} = \frac{(x_j^{(i)} - \mu)}{\sqrt{\sigma^2 + \epsilon}}$$

where $\epsilon$ is a constant value added to the global batch variance for numerical stability.

As mentioned above, some implementations may scale and shift the normalized output to compute a transformed normalized output (e.g. $y_j^{(i)}$). Specifically, the normalized output may be scaled and shifted using the global scale variable $\gamma$ and the global shift variable $\beta$ which may be learned values (the learning of these variables is discussed below in the discussion of back propagation). More particularly, the transformed normalized output (e.g. $y_j^{(i)}$) of the cross batch normalization layer may be computed as:

$$y_j^{(i)} = \gamma \hat{x}_j^{(i)} + \beta$$

The transformed normalized output (e.g. $y_j^{(i)}$) may be provided to the layer following the cross batch normalization layer 122 and 308 (e.g. layer B 310 and 312) and the neural networks 118 and 302 may continue processing successive layers until the local neural network outputs 318 and 320 are output by the final layer in the neural networks 118 and 302. The neural networks may then begin back propagation.

During backward propagation, the cross batch normalization layer may determine and back propagate the gradient of loss for the transformation, as well as compute the gradients with respect to the global scale variable $\gamma$ and the global shift variable $\beta$. In particular, the cross batch normalization layer may be provided with $$\frac{\partial L}{\partial y_j^{(i)}}$$

(i.e. the gradient of loss for the cross batch normalization layer output 332 and 334) by layer B and may operate to compute $$\frac{\partial L}{\partial \beta}, \frac{\partial L}{\partial \gamma}, \text{ and, } \frac{\partial L}{\partial x_j^{(i)}}$$

(i.e. the gradient of loss for the cross batch normalization layer input 336 and 338).

In operation, the cross batch normalization layer may compute the gradients for the global scale variable $\gamma$ and the global shift variable $\beta$. First, local intermediate values $\theta_i$ and $\phi_i$ may be computed locally as:

$$\theta_i = \sum_{j=1}^{n_i} \frac{\partial L}{\partial y_j^{(i)}}$$

$$\phi_i = \frac{\partial L}{\partial y_j^{(i)}} \cdot \hat{x}_j^{(i)}$$

where $n_i$ is the count of the local batch (i).

Similar to forward propagation, the local intermediate values $\theta_i$ and $\phi_i$ may be distributed among the neural network 118 and 302.

Each neural network 118 and 302 may then locally determine $$\frac{\partial L}{\partial \beta} \text{ and } \frac{\partial L}{\partial \gamma}$$

using the local intermediate values $\theta_i$ and $\phi_i$. Specifically, $$\frac{\partial L}{\partial \beta}, \text{ and } \frac{\partial L}{\partial \gamma}$$

may be computed as:

$$\frac{\partial L}{\partial \beta} = \sum_i \theta_i$$

$$\frac{\partial L}{\partial \gamma} = \sum_i \phi_i$$

To compute $$\frac{\partial L}{\partial x_j^{(i)}},$$

the gradients of the global scale variable $\gamma$ and the global shift variable $\beta$ may be utilized. As such, by storing $$\frac{\partial L}{\partial \beta}, \text{ and } \frac{\partial L}{\partial \gamma},$$

the cross batch normalization layer may compute $$\frac{\partial L}{\partial x_j^{(i)}}$$

without further aggregation. Specifically, $$\frac{\partial L}{\partial x_j^{(i)}}$$

may be calculated as:

$$\frac{\partial L}{\partial x_j^{(i)}} = \frac{\gamma}{N\sqrt{\sigma^2 + \epsilon}} \left[ N \frac{\partial L}{\partial y_j^{(i)}} - \frac{\partial L}{\partial \beta} - \hat{x}_j^{(i)} \frac{\partial L}{\partial \gamma} \right]$$

Once the neural network system 300 has been trained, the neural network system 300 may receive a new neural network input for processing and process the neural network input through the neural network layers to generate a new neural network output for the input in accordance with the trained values of the parameters of the components of the neural network system 300. The operations performed by the cross batch normalization layer 122 and 308 during the processing of the new neural network input also depend on the nature of the neural network layer A 304 and 306.

In some cases, the means and standard deviations utilized after training are computed from all outputs generated by the layer preceding the cross batch normalization layer during the training of the neural network system. In some other cases, however, the means and standard deviations used in the cross batch normalization layer may be computed from the outputs generated by the layer preceding the cross batch normalization layer after training, e.g., from preceding layer outputs generated during in a most recent time window of specified duration or from a specified number of preceding layer outputs most recently generated by the layer preceding the cross batch normalization layer.

In particular, in some cases, the distribution of network inputs and, accordingly, the distribution of preceding layer outputs may change between the training examples used during training and the new neural network inputs used after the neural network system is trained, e.g., if the new neural network inputs are different kinds of inputs from the training examples. For example, the neural network system may have been trained on user images and may now be used to process video frames. The user images and the video frames may have different distributions in terms of the classes pictured, image properties, composition, and so on. Therefore, normalizing the preceding layer inputs using statistics from the training may not accurately capture the statistics of the preceding layer outputs being generated for the new inputs. Thus, in these cases, the cross batch normalization layer may use normalization statistics computed from preceding layer outputs generated by the layer preceding the cross batch normalization layer after training.

The cross batch normalization layer 122 and 308 may be included at various locations in the sequence of neural network layers and, in some implementations, multiple cross batch normalization layers may be included in the sequence.

While the process shown in FIG. 3 relates to parallel processing of local batches of a global batch, other examples may process local batches as components of a rolling global batch that grows with each sequentially processed local batch using the above disclosed definition of global batch variance.

Figure 4A:
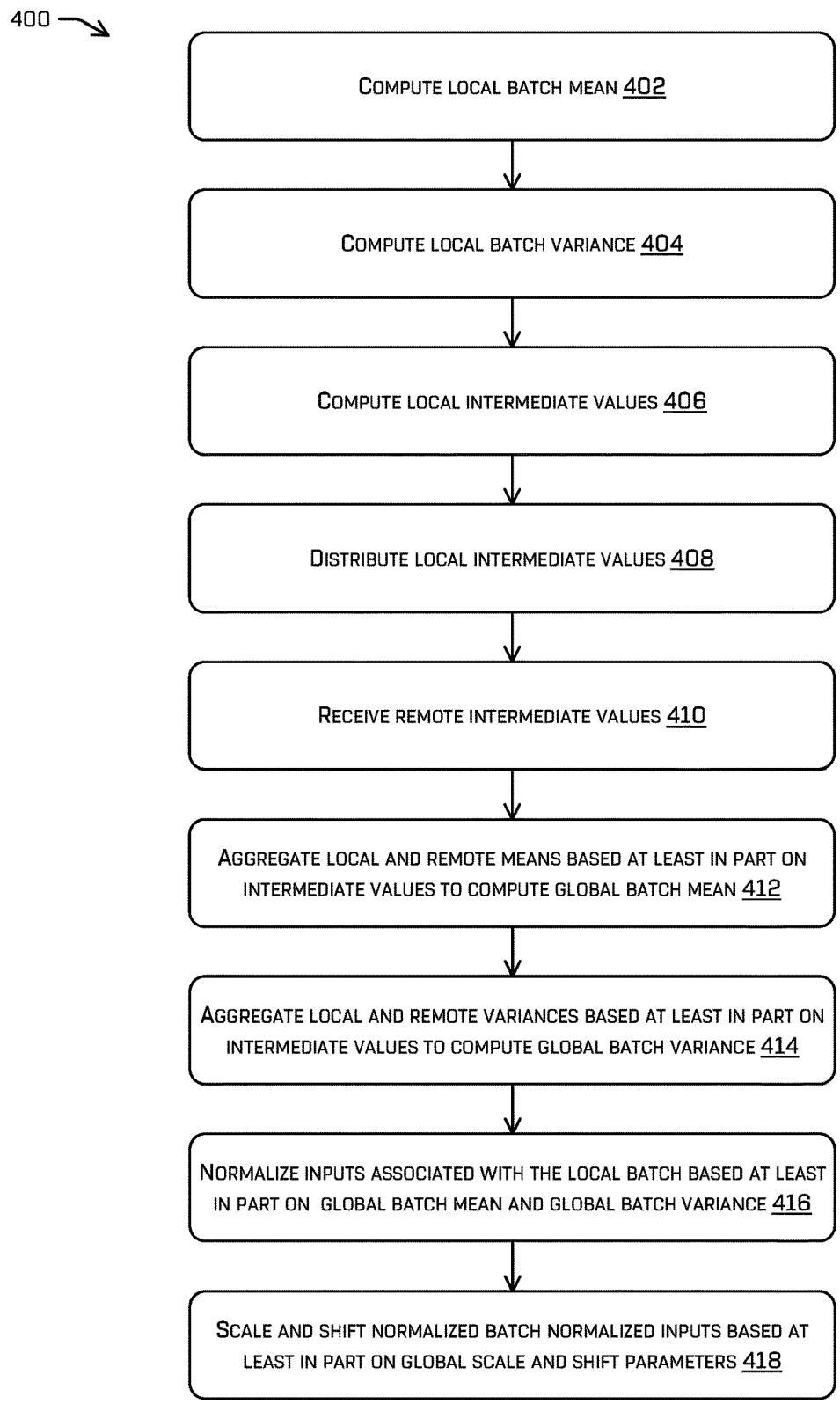
FIG. 4A illustrates an example process for generating a cross batch normalization layer output during training of a neural network on a global batch of training examples.

FIG. 4A illustrates an example process 400 for generating a cross batch normalization layer output during training of a neural network on a global batch of training examples. More particularly, process 400 may relate to the processing at a particular computing device of a plurality of computing device that collectively form a distributed training pipeline for a neural network. This process 400 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The process 400 can be performed by any component, such as the first processing unit 104 of FIG. 1, the second processing unit 106 of FIG. 1, the vehicle computing device 204 of FIG. 2, another processing unit or computing device, etc. For ease of discussion, the process 400 will be discussed in the context of FIG. 1 (and FIG. 3, in some cases). In examples, the process 400 is associated with a forward propagation portion of a training stage for an artificial neural network.

In FIG. 4A, at 402, the first processing unit 104 may compute a local batch mean for inputs associated with training samples of a local batch. At 404, the first processing unit 104 may compute a local batch variance for the inputs associated with training samples of the local batch. At 406, the first processing unit 104 may compute local intermediate values for the inputs associated with the training samples of the local batch.

At 408, the first processing unit 104 and the first processing units 104 of other computing devices may distribute the local intermediate values to one another. At 410, the first processing unit 104 may receive remote intermediate values from the other computing devices.

At 412, the first processing unit 104 may aggregate the local and remote means using the intermediate values to compute a global batch mean. Then, at 414, the first processing unit 104 may aggregate local and remote variances using intermediate values to compute a global batch variance.

At 416, the first processing unit 104 may normalize the inputs associated with local batch using the global batch mean and global batch variance. Then, at 418, the first processing unit 104 may scale and shift the normalized inputs using a global scale parameter and a global shift parameter. The first processing unit 104 may then output the transformed normalized local output to the next layer in the neural network. The process then continues to 452 of FIG. 4B for back propagation in the cross batch normalization layer.

Figure 4B:
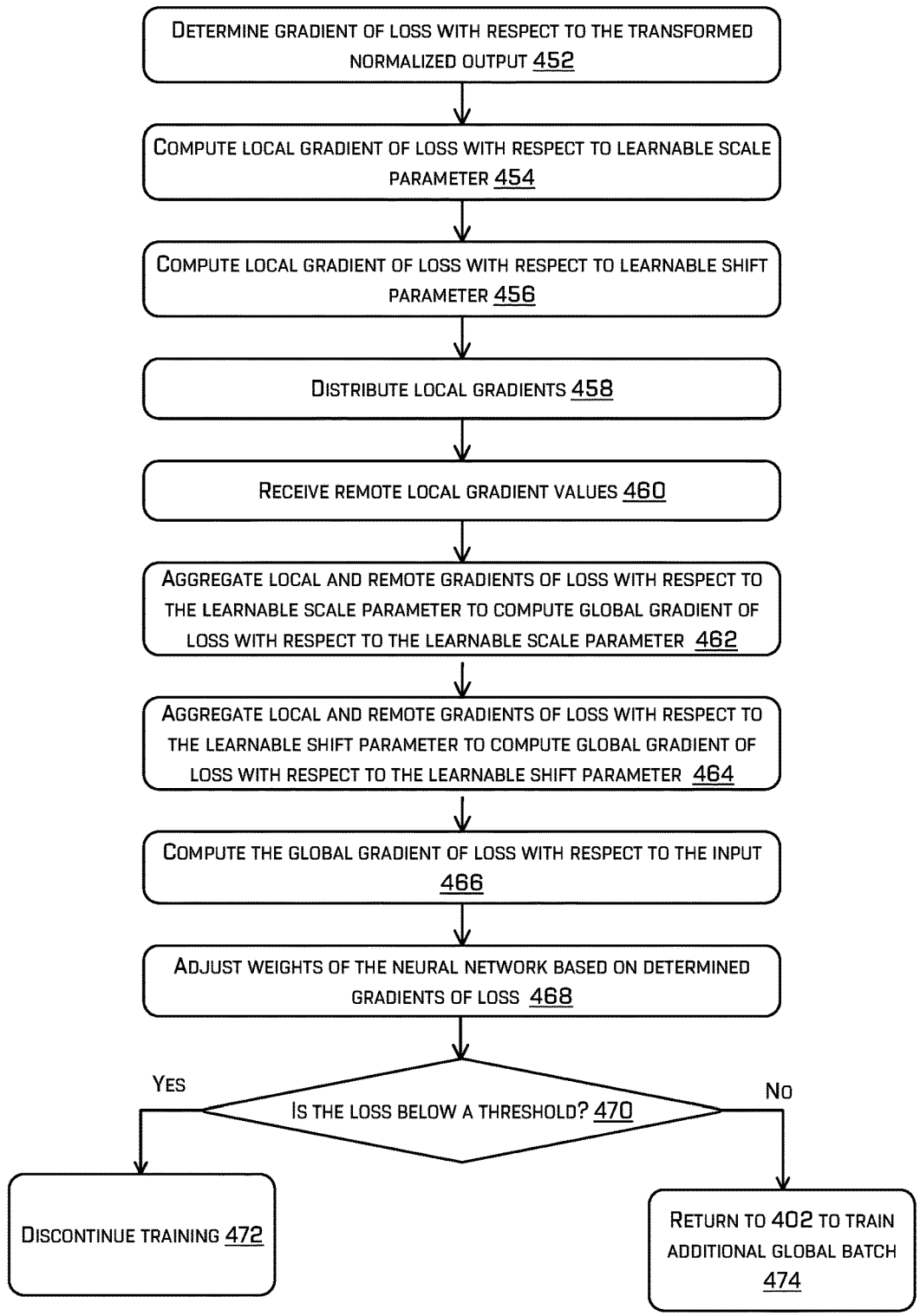
FIG. 4B illustrates an example process for training of a neural network including a cross batch normalization layer on a global batch of training examples.

FIG. 4B illustrates an example process 450 for training of a neural network including a cross batch normalization layer on a global batch of training examples. More particularly, process 450 may relate to the processing at a particular computing device of a plurality of computing device that collectively form a distributed training pipeline for a neural network. In examples, the process 450 is associated with a back propagation portion of a training stage for an artificial neural network.

In FIG. 4B, at 452, the first processing unit 104 may determine a gradient of loss with respect to the transformed normalized output. In some examples, the gradient of loss with respect to the transformed normalized output may be input at the start of the back propagation portion of the training. In other examples, the first processing unit 104 may compute the gradient of loss with respect to the transformed normalized output. At 454, the first processing unit 104 may compute a local gradient of loss with respect to the learnable scale parameter. At 456, the first processing unit 104 may compute a local gradient of loss with respect to the learnable shift parameter.

At 458, the first processing unit 104 and the first processing units 104 of other computing devices may distribute the local gradients to one another. At 460, the first processing unit 104 may receive remote gradients from the other computing devices.

At 462, the first processing unit 104 may aggregate the local and remote gradients of loss with respect to the learnable scale parameter to compute global gradient of loss with respect to the learnable scale parameter. Then, at 464, the first processing unit 104 may aggregate the local and remote gradients of loss with respect to the learnable shift parameter to compute global gradient of loss with respect to the learnable shift parameter.

At 466, the first processing unit 104 may compute the global gradient of loss with respect to the input. Then, at 468, the first processing unit 104 may adjust the current values of the parameters of the neural network based at least in part on the determined gradients of loss.

The first processing unit 104 may then determine if the loss with respect to the input is below a threshold at 470. If so, the process may continue to 472 where the training is discontinued. On the other hand, if the loss is not below the threshold, at 474, the process may return to 402 and the training of the neural network may continue based on a new global batch including a plurality of new local batches of training examples. As mentioned above, the training may be performed by a single computing device operating on local batches in sequence or may be performed by a distributed training pipeline of multiple computing devices training local batches in parallel.

Figure 5:
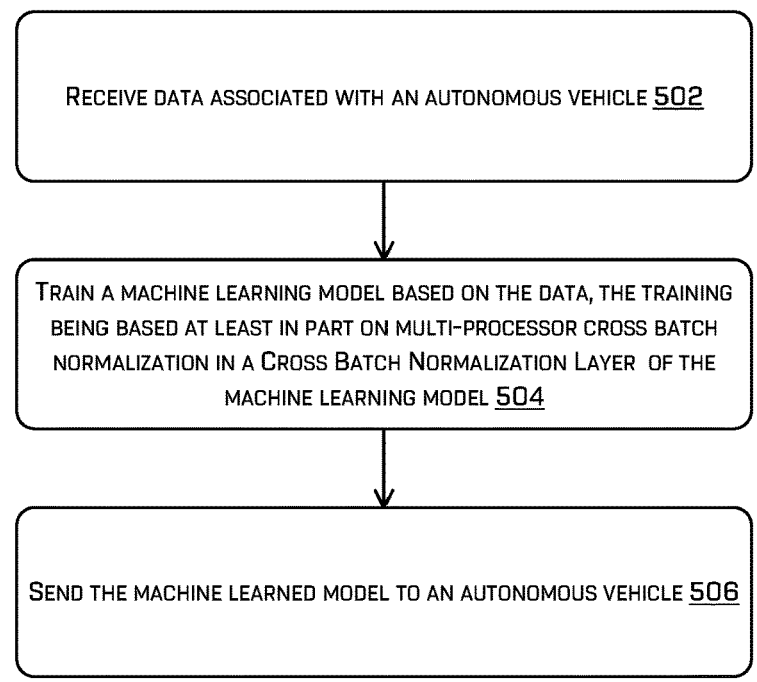
FIG. 5 illustrates an example process for training of a neural network including a cross batch normalization layer in the context of an autonomous vehicle use case.

FIG. 5 illustrates an example process 500 for training of a neural network including a cross batch normalization layer in the context of an autonomous vehicle use case.

In particular, at 502, the computing device (e.g. computing device 102) may receive data associated with an autonomous vehicle (e.g. vehicle 202). The computing device may then train a machine learning model based on the data at 504, the training being based at least in part on multi-processor cross batch normalization in a cross batch normalization layer of the machine learning model. In some examples, training may be conducted as discussed above with respect to FIGS. 1-4B. Next, at 506, the computing device may send the machine learned model to the same or a different autonomous vehicle (e.g. vehicle 202).

Example Clauses

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A. A method comprising: receiving, at a batch normalization layer of a neural network associated with a first computing device, a first layer output from a first neural network layer of the neural network, wherein the first layer output is based on a local batch of training examples of a global batch, the global batch comprising the local batch and a remote batch of training examples; determining, based at least in part on a component of the first layer output, as a local batch normalization statistic, a first value based at least in part on local batch mean and a second value based at least in part on a local batch variance for the local batch; subsequent to the determining of the first value and the second value, transmitting the local batch normalization statistic to a second computing device training a copy of the neural network using the remote batch; receiving, from the second computing device, a remote batch normalization statistic associated with the remote batch; determining, based at least in part on the local batch normalization statistic and the remote batch normalization statistic, a global batch mean and a global batch variance; and generating a normalized component of a normalized output associated with the component of the first layer output based at least in part on the global batch mean and the global batch variance.

B. The method of example A, further comprising: computing the global batch variance based at least in part on as an aggregation of a difference between a sum of the local batch variance and a square of the local batch mean and a square of the global batch mean.

C. The method of example A, further comprising: generating a transformed component of a batch normalization layer output by scaling and shifting the normalized component of the normalized output based on a global scaling parameter and a global shift parameter; and determining the global scaling parameter and the global shift parameter based on a gradient of loss during a back propagation of a training of the neural network on the local batch.

D. The method of example C, further comprising: determining a gradient of loss with respect to the global shift parameter comprising: determining, as a local intermediate shift parameter, a sum of gradients of the loss with respect to the batch normalization layer output; receiving a remote intermediate shift parameter for the remote batch of training examples; and combining the local intermediate shift parameter and the remote intermediate shift parameter to generate the gradient of loss with respect to the global shift parameter; and determining a gradient of loss with respect to the global scaling parameter comprising: determining, as a local intermediate scaling parameter, a dot product of the gradient of loss with respect to the batch normalization layer output of the transformed component and the normalized component of the normalized output; receiving a remote intermediate scaling parameter for the remote batch of training examples; and aggregating the local intermediate scaling parameter and the remote intermediate scaling parameter to generate the gradient of loss with respect to the global scaling parameter.

E. The method of example A, further comprising determining a gradient of loss with respect to the first layer output based on a gradient of loss with respect to a global shift parameter and a gradient of loss with respect to a global scaling parameter.

F. The method of example A, wherein: the first value comprises a weighted local batch mean of the local batch; and the second value comprises a weighted sum of a square of the local batch mean and the local batch variance of the local batch, wherein the weighting of the weighted local batch mean is based on the number of training examples in the local batch relative to the number of training examples across the global batch.

G. One or more non-transitory computer-readable media storing instructions that, when executed, cause one or more processors of a first processing unit to perform acts comprising: inputting, into a neural network, a first portion of a set of examples as a local batch; receiving, based at least in part on the first portion, a first layer output from a first neural network layer of the neural network; determining, based at least in part on a component of the first layer output, as a local batch normalization statistic, a first value based at least in part on local batch mean and a second value based at least in part on a local batch variance for the local batch; transmitting the local batch normalization statistic to a second computing device training a copy of the neural network using the remote batch; receiving, from a remote computing system, a remote batch normalization statistic associated with a second portion of the set of examples included in a remote batch; determining a global batch mean based on the first value and the remote batch normalization statistic; determining a global batch variance based at least in part on the second value and the remote batch normalization statistic; and generating a normalized component of a normalized output associated with the component of the first layer output using the global batch mean and the global batch variance.

H. The one or more non-transitory computer-readable media of example G, wherein the acts further comprise computing the global batch variance based at least in part on as an aggregation of a difference between a sum of the local batch variance and a square of the local batch mean and a square of the global batch mean.

I. The one or more non-transitory computer-readable media of example G, wherein the acts further comprise: determining a global scaling parameter and a global shift parameter based on a gradient of loss during a back propagation of a training of the neural network on the local batch; and generating a transformed component of a batch normalization layer output by scaling and shifting the normalized component of the normalized output based on the global scaling parameter and the global shifting parameter.

J. The one or more non-transitory computer-readable media of example I, wherein the acts further comprise: determining a local intermediate shift parameter by aggregating a gradient of loss with respect to the batch normalization layer output; receiving a remote intermediate shift parameter for the remote batch; and aggregating, as a gradient of loss with respect to the global shift parameter, the local intermediate shift parameter and the remote intermediate shift parameter.

K. The one or more non-transitory computer-readable media of example J, wherein the acts further comprise: determining a local intermediate scaling parameter as a dot product of the gradients of loss as a function of the batch normalization layer output and the normalized component of the normalized output; receiving a remote intermediate scaling parameter for the remote batch; and aggregating, as a gradient of loss with respect to the global scaling parameter, the local intermediate scaling parameter and the remote intermediate scaling parameter.

L. The one or more non-transitory computer-readable media of example G, wherein the acts further comprise determining a gradient of loss with respect to the first layer output based on a gradient of loss with respect to a global shift parameter and a gradient of loss with respect to a global scaling parameter.

M. The one or more non-transitory computer-readable media of example G, wherein the first portion comprises a first number of training examples and the second portion comprises a second number of training examples different from the first number.

N. The one or more non-transitory computer-readable media of example G, wherein the remote batch normalization statistic comprises, for the remote batch, a remote batch mean and a remote batch variance.

O. The one or more non-transitory computer-readable media of example G, wherein: the first value comprises a weighted local batch mean of the local batch; and the second value comprises a weighted sum of a square of the local batch mean and the local batch variance of the local batch, wherein the weighting of the weighted local batch mean is based on a number of training examples in the local batch relative to a number of training examples across the global batch.

P. A system comprising: one or more processors; and one or more computer-readable media storing instructions executable by the one or more processors, wherein the instructions, when executed, cause the one or more processors to perform acts comprising: inputting, into a neural network, a first portion of a set of examples as a local batch; receiving, based at least in part on the first portion, a first layer output from a first neural network layer of the neural network; and determining a local batch mean and a local batch variance for the local batch based at least in part on a component of the first layer output; receiving, from a remote computing system, a remote batch normalization statistic associated with a second portion of the set of examples included in a remote batch; determining a global batch mean based on the local batch mean and the remote batch normalization statistic; determining a global batch variance based at least in part on the local batch variance and the remote batch normalization statistic; and generating a normalized component of a normalized output associated with the component of the first layer output using the global batch mean and the global batch variance.

Q. The system of example P, wherein the acts further comprise: determining a global scaling parameter and a global shift parameter based on a gradient of loss during a back propagation of a training of the neural network on the local batch; and generating a transformed component of a batch normalization layer output by scaling and shifting the normalized component of the normalized output based on the global scaling parameter and the global shifting parameter.

R. The system of example Q, wherein the acts further comprise: determining a local intermediate shift parameter by aggregating a gradient of loss with respect to the batch normalization layer output; determining a local intermediate scaling parameter as a dot product of the gradients of loss as a function of the batch normalization layer output and the normalized component of the normalized output; receiving a remote intermediate shift parameter and a remote intermediate scaling parameter for the remote batch; and aggregating, as a gradient of loss with respect to the global shift parameter, the local intermediate shift parameter and the remote intermediate shift parameter; aggregating, as a gradient of loss with respect to the global scaling parameter, the local intermediate scaling parameter and the remote intermediate scaling parameter.

S. The system of example P, wherein the acts further comprise determining a gradient of loss as a function of the first layer output based on a gradient of loss as a function of a global shift parameter and a gradient of loss as a function of a global scaling parameter.

T. The system of example P, wherein the first portion comprises a first number of training examples and the second portion comprises a second number of training examples different from the first number.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, at a batch normalization layer of a neural network associated with a first computing device, a first layer output from a first neural network layer of the neural network, wherein the first layer output is based on a local batch of training examples of a global batch, the global batch comprising the local batch and a remote batch of training examples;
determining, based at least in part on a component of the first layer output, as a local batch normalization statistic, a first intermediate value based at least in part on a local batch mean and a second intermediate value based at least in part on a local batch variance for the local batch, the first intermediate value different from the local batch mean and the second intermediate value different from the local batch variance;
subsequent to the determining of the first intermediate value and the second intermediate value, transmitting the local batch normalization statistic to a second computing device training a copy of the neural network using the remote batch;
receiving, from the second computing device, a remote batch normalization statistic associated with the remote batch;
determining, based at least in part on the first intermediate value, the second intermediate value, and the remote batch normalization statistic, a global batch mean and a global batch variance; and
generating a normalized component of a normalized output associated with the component of the first layer output based at least in part on the global batch mean and the global batch variance.

2. The method of claim 1, further comprising:
computing the global batch variance based at least in part on as an aggregation of a difference between a sum of the local batch variance and a square of the local batch mean and a square of the global batch mean.

3. The method of claim 1, further comprising:
generating a transformed component of a batch normalization layer output by scaling and shifting the normalized component of the normalized output based on a global scaling parameter and a global shift parameter; and
determining the global scaling parameter and the global shift parameter based on a gradient of loss during a back propagation of a training of the neural network on the local batch.

4. The method of claim 3, further comprising:
determining a gradient of loss with respect to the global shift parameter comprising:
determining, as a local intermediate shift parameter, a sum of gradients of the loss with respect to the batch normalization layer output;
receiving a remote intermediate shift parameter for the remote batch of training examples; and
combining the local intermediate shift parameter and the remote intermediate shift parameter to generate the gradient of loss with respect to the global shift parameter; and
determining a gradient of loss with respect to the global scaling parameter comprising:
determining, as a local intermediate scaling parameter, a dot product of the gradient of loss with respect to the batch normalization layer output of the transformed component and the normalized component of the normalized output;
receiving a remote intermediate scaling parameter for the remote batch of training examples; and
aggregating the local intermediate scaling parameter and the remote intermediate scaling parameter to generate the gradient of loss with respect to the global scaling parameter.

5. The method of claim 1, further comprising determining a gradient of loss with respect to the first layer output based on a gradient of loss with respect to a global shift parameter and a gradient of loss with respect to a global scaling parameter.

6. The method of claim 1, wherein:
the first intermediate value comprises a weighted local batch mean of the local batch; and
the second intermediate value comprises a weighted sum of a square of the local batch mean and the local batch variance of the local batch, wherein the weighting of the weighted local batch mean is based on a number of training examples in the local batch relative to a number of training examples across the global batch.

7. One or more non-transitory computer-readable media storing instructions that, when executed, cause one or more processors of a first processing unit to perform acts comprising:
inputting, into a neural network, a first portion of a set of examples as a local batch;
receiving, based at least in part on the first portion, a first layer output from a first neural network layer of the neural network;
determining, based at least in part on a component of the first layer output, as a local batch normalization statistic, a first intermediate value based at least in part on a local batch mean and a second intermediate value based at least in part on a local batch variance for the local batch, the first intermediate value different from the local batch mean and the second intermediate value different from the local batch variance;
transmitting the local batch normalization statistic to a second computing device training a copy of the neural network using a remote batch;
receiving, from a remote computing system, a remote batch normalization statistic associated with a second portion of the set of examples included in the remote batch;
determining a global batch mean based on the first intermediate value and the remote batch normalization statistic;
determining a global batch variance based at least in part on the second intermediate value and the remote batch normalization statistic; and
generating a normalized component of a normalized output associated with the component of the first layer output using the global batch mean and the global batch variance.

8. The one or more non-transitory computer-readable media of claim 7, wherein the acts further comprise computing the global batch variance based at least in part on as an aggregation of a difference between a sum of the local batch variance and a square of the local batch mean and a square of the global batch mean.

9. The one or more non-transitory computer-readable media of claim 7, wherein the acts further comprise:
determining a global scaling parameter and a global shift parameter based on a gradient of loss during a back propagation of a training of the neural network on the local batch; and
generating a transformed component of a batch normalization layer output by scaling and shifting the normalized component of the normalized output based on the global scaling parameter and the global shifting parameter.

10. The one or more non-transitory computer-readable media of claim 9, wherein the acts further comprise:
determining a local intermediate shift parameter by aggregating a gradient of loss with respect to the batch normalization layer output;
receiving a remote intermediate shift parameter for the remote batch; and
aggregating, as a gradient of loss with respect to the global shift parameter, the local intermediate shift parameter and the remote intermediate shift parameter.

11. The one or more non-transitory computer-readable media of claim 10, wherein the acts further comprise:
determining a local intermediate scaling parameter as a dot product of the gradients of loss as a function of the batch normalization layer output and the normalized component of the normalized output;
receiving a remote intermediate scaling parameter for the remote batch; and
aggregating, as a gradient of loss with respect to the global scaling parameter, the local intermediate scaling parameter and the remote intermediate scaling parameter.

12. The one or more non-transitory computer-readable media of claim 7, wherein the acts further comprise determining a gradient of loss with respect to the first layer output based on a gradient of loss with respect to a global shift parameter and a gradient of loss with respect to a global scaling parameter.

13. The one or more non-transitory computer-readable media of claim 7, wherein the first portion comprises a first number of training examples and the second portion comprises a second number of training examples different from the first number.

14. The one or more non-transitory computer-readable media of claim 7, wherein the remote batch normalization statistic comprises, for the remote batch, a remote batch mean and a remote batch variance.

15. The one or more non-transitory computer-readable media of claim 7, wherein:
the first intermediate value comprises a weighted local batch mean of the local batch; and
the second intermediate value comprises a weighted sum of a square of the local batch mean and the local batch variance of the local batch, wherein the weighting of the weighted local batch mean is based on a number of training examples in the local batch relative to a number of training examples across the global batch.

16. A system comprising:
one or more processors; and
one or more computer-readable media storing instructions executable by the one or more processors, wherein the instructions, when executed, cause the one or more processors to perform acts comprising:
inputting, into a neural network, a first portion of a set of examples as a local batch;
receiving, based at least in part on the first portion, a first layer output from a first neural network layer of the neural network; and
determining a local batch mean and a local batch variance for the local batch based at least in part on a component of the first layer output;
receiving, from a remote computing system, a remote batch normalization statistic associated with a second portion of the set of examples included in a remote batch;
determining a global batch mean based on the local batch mean and the remote batch normalization statistic;
determining a global batch variance based at least in part on the local batch variance and the remote batch normalization statistic;
generating a normalized component of a normalized output associated with the component of the first layer output using the global batch mean and the global batch variance; and
determining a gradient of loss as a function of the first layer output based on a gradient of loss as a function of global shift parameter and a gradient of loss as a function of a global scaling parameter.

17. The system of claim 16, wherein the acts further comprise:
determining the global scaling parameter and the global shift parameter based on the gradient of loss during a back propagation of a training of the neural network on the local batch; and
generating a transformed component of a batch normalization layer output by scaling and shifting the normalized component of the normalized output based on the global scaling parameter and the global shifting parameter.

18. The system of claim 17, wherein the acts further comprise:
determining a local intermediate shift parameter by aggregating a gradient of loss with respect to the batch normalization layer output;
determining a local intermediate scaling parameter as a dot product of the gradients of loss as a function of the batch normalization layer output and the normalized component of the normalized output;
receiving a remote intermediate shift parameter and a remote intermediate scaling parameter for the remote batch; and
aggregating, as a gradient of loss with respect to the global shift parameter, the local intermediate shift parameter and the remote intermediate shift parameter;
aggregating, as a gradient of loss with respect to the global scaling parameter, the local intermediate scaling parameter and the remote intermediate scaling parameter.

19. The system of claim 16, wherein the first portion comprises a first number of training examples and the second portion comprises a second number of training examples different from the first number.

20. The system of claim 16, wherein the acts further comprise:
determining, as a local batch normalization statistic, a first intermediate value based at least in part on the local batch mean and a second intermediate value based at least in part on a local batch variance for the local batch, the first intermediate value different from the local batch mean and the second intermediate value different from the local batch variance;

transmitting the local batch normalization statistic to the remote computing system; and wherein:

determining the global batch mean based on the local batch mean and the remote batch normalization statistic includes determining the global batch mean based on the first intermediate value and the remote batch normalization statistic; and determining the global batch variance based at least in part on the local batch variance and the remote batch normalization statistic includes determining the global batch variance based at least in part on the second intermediate value and the remote batch normalization statistic.

* * * * *